United States Patent Office 3,010,876
Patented Nov. 28, 1961

3,010,876
OXIDATION OF STEROID COMPOUNDS IN PRESENCE OF ANTIBIOTICS
Dan J. Badia, East Northport, and Joseph L. Sardinas, Brooklyn, N.Y., assignors to Chas. Pfizer & Co., Inc., New York, N.Y., a corporation of Delaware
No Drawing. Filed Nov. 27, 1957, Ser. No. 699,173
11 Claims. (Cl. 195—51)

This application is concerned with the oxidation of certain steroid compounds by microbiological means. Particularly, it is concerned with the oxidation of certain 3-keto-4-unsaturated steroid compounds by means of certain microorganisms or oxidizing enzymes produced by these microorganisms.

In copending application, Serial Number 538,514, filed October 4, 1955, there is described a method of producing 3-keto $\Delta^{1,4}$ steroids by the fermentation of 3-keto $\Delta^4$ steroids with an organism of the genus Nocardia. A species of Corynebacterium, C. simplex, is reported to nuclear dehydrogenate 3-keto $\Delta^4$ steroids to 3-keto $\Delta^{1,4}$ steroids (Journal of American Chemical Society, vol. 77, p. 4184 (1955)).

It has now been found that this process can be better effected resulting in high yields of 3-keto $\Delta^{1,4}$ steroids under more easily controllable conditions, when minor amounts of antibacterial antibiotics are added to the reaction medium. The utilization of a minor amount of an antibiotic is particularly effective when a large inoculum of Nocardia or Corynebacterium species is added to the steroid reaction medium. Frequently, if a large amount of inoculum is used, in the absence of an antibiotic, there is noted a destruction of the steroid content of the reaction mixture. However, the use of larger inoculum of the selected species would provide a greater economy in the production of 3-keto $\Delta^{1,4}$ steroids and a more marked efficiency in the utilization of valuable apparatus by providing a higher enzyme activity in the reaction medium which permits conversion of larger amounts of 3-keto $\Delta^4$ steroids. This higher level of enzyme activity in the fermentation production of 3-keto $\Delta^{1,4}$ steroids is now made possible when minor amounts of an antibacterial antibiotic are incorporated together with the inoculum in the reaction medium. The teachings of this invention provide to the industry a more economical and practical method of producing 3-keto $\Delta^{1,4}$ steroids some of which are compounds useful in the treatment of various inflammatory disease such as rheumatoid arthritis, asthma and dermatosis. Other advantages of this invention are made obvious in the following disclosure.

The conversion of 3-keto $\Delta^4$ steroids to 3-keto $\Delta^{1,4}$ steroids by the oxidizing enzymes of species of the genera Nocardia and Corynebacterium is brought about in time periods of up to about 2 days. It has been found that when a large inoculum of Nocardia or Corynebacterium species is employed, for example, an inoculum in the region of about 5% and higher up to about 20% of the total reaction volume, appreciably lower yields of the desired steroids are obtained. It has been unexpectedly discovered, however, that when employing inoculum of such size, namely, 5% and higher inoculum, as mentioned above, 3-keto $\Delta^{1,4}$ steroids may be obtained in excellent yield even after only 12 hours when a small amount of an antibacterial antibiotic, such as tetracycline-type antibiotic, neomycin, streptomycin or dihydrostreptomycin, is added to the reaction medium. By tetracycline-type antibiotic is meant tetracycline, oxytetracycline and chlortetracycline, bromtetracycline, demethyltetracycline and demethylchlortetracycline and their various active salts and derivatives such as acid salts, for example, the hydrohalide salts and metal salts such as the alkali metal salts. The amphoteric substances, either in the anhydrous or hydrated form may also be employed. Suitable forms of neomycin, streptomycin and dihydrostreptomycin are the various active acid salts such as the sulfate and phosphate as well as the hydrohalide salts. The free base forms may also be used. The amount of antibacterial antibiotic added to the reaction mixture should be such that total blocking of the enzyme systems of the organisms does not occur. Specifically, if too large a quantity of the antibiotic is added to the reaction mixture, steroid conversion does not take place although no appreciable steroid destruction is noted. With too little antibiotic, steroid destruction is quite pronounced although conversion to 3-keto $\Delta^{1,4}$ steroids may take place. In the case of each antibiotic, a specific range should be employed to obtain desirable amounts of 3-keto $\Delta^{1,4}$ steroids. No general range, suitable for all antibiotics seems to be applicable. It is sufficient to generally state that certain levels of antibacterial antibiotics, such as those mentioned above, enhance the production of the desired steroid. Other effective antibacterial antibiotics, as well as the optimum effective level to be employed, may be determined by the simple test procedure described below and are considered to be within the purview of this invention. It is further found that in addition to excellent yields, the level of the antibiotic employed in the reaction mixture may be used to control the time required for maximum yields of steroid. For example, when a 5% inoculum of Nocardia or Corynebacterium species is employed at a level of tetracycline of 5 mcg. per milliliter of a reaction medium containing Compound F ($\Delta^4$-pregnene-11$\beta$, 17$\alpha$, 21-triol-3, 20-dione), maximum yields of 84% of prednisolone are obtained in 40 hours. When a level of 100 mcg of streptomycin per milliliter is employed, a 79% yield of prednisolone is observed after 40 hours. Further mixtures of antibiotics may be employed. For example, when a mixture containing 1 mcg. of oxytetracycline and 0.25 mcg. of neomycin per milliliter of reaction medium is employed, a maximum yield of 68% is obtained in slightly under 30 hours. Mixtures of these antibiotics are found particularly effective, a synergistic action being noted in comparison with the effect of either oxytetracycline or neomycin above. Further, at a level of 0.5 mcg. of oxytetracycline and 0.125 mcg. of neomycin, a 64% yield of prednisolone is obtained in only 26 hours when employing a 5% inoculum. The reaction time which is generally required for maximum yields is dependent upon the level of antibiotic employed. For best results, the tetracycline-type antibiotics may be utilized at a level of from about two to fifteen mcg. per milliliter of reaction mixture when employing 5% inoculum of a Nocardia or Corynebacterium species. Streptomycin and dihydrostreptomycin may be employed at a level of from about 50 to 200 mcg. per milliliter of reaction medium and neomycin at a level of from about 1 to 4 mcg. per milliliter. When amounts of antibiotics larger than the higher limit described above are employed the yields of steroid fall off and longer reaction time is required. However, with larger inoculum for example, up to 18% inoculum higher levels of antibiotics may be employed for best results. For example, a mixture of 1.0 mcg./ml. of oxytetracycline and 0.25 mcg./ml. of neomycin results in a 77% conversion of compound F to prednisolone in only 16 hours. At a level of 4 mcg./ml. of oxytetracycline and 1 mcg./ml. of neomycin with the same inoculum, a 69% yield of prednisolone is obtained in 60 hours.

Other antibacterial antibiotics may be tested for their efficacy in the process of conversion of 3-keto $\Delta^4$ steroids to 3-keto $\Delta^{1,4}$ steroids as described above by a simple test procedure which is based on the detection of steroids contained in a small scale fermentation reaction medium. For example, a number of sample reaction media may be prepared in small fermentation pots to each of which is added the same volume of inoculum of a microorganism of the Nocardia or Corynebacterium species along with graded amounts of the antibacterial antibiotics. The efficacy of the antibiotics to be tested may be determined by periodic assays of the sample reaction media by means of paper chromatography, detecting the amounts of total steroid present in the reaction mixture by determining the percentages of 3-keto $\Delta^4$ steroids and 3-keto $\Delta^{1,4}$ steroids still present in the reaction mixture. Many standard paper chromatography procedures which may be conveniently used are described in the literature. The optimum level of antibiotic as well as the time for optimum conversion of 3-keto $\Delta 4$ steroids to 3-keto $\Delta^{1,4}$ steroids may be determined in this simple test procedure. Other antibacterial agents may be used in the process of this invention and the optimum range of concentration determined by this test procedure. Common antibacterial antiotics which are demonstrated to be efficacious by this test procedure are: penicillin, tyrothrycin, polymixin, chloramphenicol, erythromycin, carbomycin, bacitracin, viomycin, gramicidin, novobiocin, dextromycin, oleandomycin, and chloromycetin. The optimum concentration of these antibiotics may readily be determined as described above. Antifungal antibiotics, for example, nystatin, Thiolutin, cycloheximide and rimocidin, do not affect the enzymatic conversion of 3-keto $\Delta^4$ steroids to 3-keto $\Delta^{1,4}$ steroids.

Other organisms which produce the enzyme systems required for the conversion of 3-keto $\Delta^4$ steroids to 3-keto $\Delta^{1,4}$ steroids may also be tested in the above described procedure and the effective level of antibiotics determined. Such organisms which have been reported in the literature are species of Micromonospore, Mycobacterium, Fusarium, Bacillus, Didymella, Calonestria, Aphiobolus and Alternaria. The nuclear dehydrogenation of 3-keto $\Delta^4$ steroids with Mycobacterium species is not affected by the addition of minor amounts of the above mentioned antibiotics. No appreciable increase in yields or decrease in time required for reaction is noted. Since Mycobacterium species are not appreciably affected in the present process, it is not intended that all of these organisms should give response to the antibiotics. However, a minimum of testing, employing the procedure described above, will indicate the efficacy of the mentioned antibiotics in enhancing the yield of 3-keto $\Delta^{1,4}$ steroid.

A variety of 3-keto-4-unsaturated steroid compounds may be used as starting materials for the reactions of this invention. These include such materials as:

Compound F (hydrocortisone)
Compound E (cortisone)
Corticosterone
Compound S
14α-hydroxy—Compound S
Desoxycorticosterone
Androstenedione
19-nortestosterone
17α-hydroxyprogesterone
11-ketoprogesterone
9α-fluoro—Compound F
14α - hydroxy—Compound F
11-epi-hydrocortisone
$\Delta^{4,6}$-androstadiendione
11β,17α-dihydroxyprogesterone
$\Delta^{14}$-dehydro—Compound S
Testosterone
Progesterone
16-dehydroprogesterone
$\Delta^{9(11)}$-dehydro—Compound S In general this process is most applicable to 3-keto $\Delta^4$ steroid compounds having from 18 to 21 atoms in the carbon skeleton. The products of the reaction may be detected by careful comparison of paper chromatograms of the products formed by the reaction of this invention with known steroid compounds. This method has been tested on a variety of compound and is known to give reliable results. Reports of this method are available in the chemical literature.

In carrying out this invention, various species of the genera Nocardia and Corynebacterium are useful for bringing about the dehydrogenation of the A ring. These organisms are readily available from public culture collections, for example, the American Type Culture Collection of Washington, D.C. Species of the genus Nocardia which are useful for the process of this invention include *Nocardia convoluta*, ATCC 4275, *Nocardia corallina*, ATCC 4273, *Nocardia erythropdis*, ATCC 4277, *Nocardia gardneri*, ATCC 12,635, *Nocardia minima*, ATCC 8074, *Nocardia polychromogenes*, ATCC 3409, and of particular value are the organisms of the species *Nocardia opaca*, ATCC 4276 and the species *Nocardia globerula*, ATCC 9356. Species of the genus Corynebacterium, such as the species *C. simplex* which is useful in the process of this invention, are also available from the American Type Culture Collection, e.g., *C. simplex*, ATCC 6946. The various species of Nocardia and Corynebacterium vary considerably in the ease and speed in which dehydrogenation is produced. There is also variation between the strains of the same species. In like manner, the various steroid substrates differ in the ease and rate in which dehydrogenation of the A ring occurs. It is readily possible, however, by a minimum of routine testing to determine the optimum conditions for the dehydrogenation of each specific steroid with each specific species of organism with each specific antibiotic.

The preferred procedure employed in the conversion of 3-keto $\Delta^4$ steroids is as follows: The nutrient media are seeded from slants of the selected Nocardia or Corynebacterium species. Such a medium may consist, for instance, of a mixture of a standard bacteriological nutrient broth base, together with added carbohydrates. The cultivation of Nocardia and Corynebacterium have been described in considerable detail in many publications. The seeded, sterile, nutrient solutions may be grown in shake flasks for two to three days to provide inoculum for larger vessels, and in turn, the larger, stirred, aerated vessels may be used for the inoculation of full production-scale vessels for submerged fermentation. The same medium of the type described above may be used for the large-scale oxidation of steroids according to this invention. Considerable variation may, of course, be made in the medium. In general there are required a carbohydrate, a source of organic nitrogen, mineral salts and various trace metals.

The steroid compound may be added directly to the nutrient medium and the medium seeded with the chosen species. Samples of the agitated aerated mixture may be removed at intervals for determination of the conversion of the steroid compound to oxidized product. The mixture is maintained at between 20° to 37° C. or higher during the growth of the cells and conversion of the steroid. In general, about 12 to 40 hours are required for maximum production of the oxidation products. Alternatively, the growth of the cells may be established before addition of the steroid. In the preparation of prednisolone ($\Delta^{1,4}$-pregnadien-11β,17α,21-triol-3,20-dione), pure Compound F may be used as starting material. Alternatively, Compound F, prepared by fermenting Compound S with a microorganism of the genus, Curvularia, as described in U.S. Patent Number 2,658,023, may be converted directly to prednisolone in situ by the addition of a Nocardia or Corynbacterium species to the original fermentation broth. This latter process is desirable because it results in improvement in the overall yield of prednisolone from Compound S. It is further desirable in that it eliminates the need for isolation and purification of Compound F. The simplicity of this process is such that there is considerable saving when this process is applied to large scale commercial production.

The antibacterial antibiotics employed in the process of the present invention should be added before or during the addition of the inoculum and may be used in any suitable form. Since they are employed at such low levels the hydrohalide salts, for example, the hydrochloride, and other salts, such as the sulfate salts, are usually employed. Sufficient amounts of suitable soluble forms of the antibiotics to provide the herein described levels of activity provide the desirable results of the present invention. For convenience, the various levels of activity per unit weight of some of the soluble salts of the antibiotics described above are:

| | $\gamma$/mg. |
|---|---|
| Oxytetracycline-HCl | 885 |
| Tetracycline-HCl | 970 |
| Chlortetracycline-HCl | 965 |
| Streptomycin sulfate | 765 |
| Neomycin sulfate | 650 |

Activity levels of other soluble forms of the antibiotics as well as the antibiotics themselves are available in the literature.

The reaction is conveniently followed by means of paper chromatography; numerous descriptions of the use of paper chromatography have been reported in the literature. The products of the new method described in this application may be isolated from aqueous solution by extraction with various water-immiscible organic solvents. Lower halogenated hydrocarbons, such as chloroform, are particularly useful. After extraction, the solvents may be removed by distillation and the solid product is then isolated. This material may be further purified by recrystallization procedures from organic solvents or by chromatography, for instance an alumina columns or on other suitable absorbent materials. The use of a silica agel-ethanol column with mixtures of methylene chloride and from 2 to 5% by volume of ethanol (95%) as a developer has been found particularly advantageous. Methods for the separation of products of this nature have been reported previously in the literature. For some uses the products need not be separated, but the crude mixture may be used as such. It has been found advantageous in some cases to acylate the crude products and work with the resulting esters which are somewhat more stable. The products are used as intermediates in the synthesis of other useful compounds. For example, the dehydrogenated products which contain unsaturation at the 1,2-position, along with the 3-keto group and the 4,5-unsaturation originally present in the starting material, are especially susceptible to Inhoffen aromatization. This gives rise to a group of derivatives of estrone. In the case of the dehydrogenation product of Compound S, side chain cleavage to give a 17-keto group may readily be accomplished by standard means, e.g. oxidation with chromic acid, and when the product of that reaction is aromatized by the Inhoffen reaction, e.g. heated to a high temperature in a hydrocarbon solvent, the very valuable compound estrone is produced.

In addition to the utility mentioned above, many of the compounds produced by this reaction are extremely valuable because of their great biological activity. For example, when hydrocortisone is treated with Nocardia or Corynebacterium according to the process of this present invention, the compound is prednisolone, which is of great utility and has advantages over hydrocortisone in the treatment of rheumatoid arthritis. When cortisone is treated there is produced the compound known as prednisone which also has great utility in the treatment of rheumatoid arthritis. It has also been found that other 3-keto $\Delta^{1,4}$ steroids possess great activity as adrenocortical hormones and are useful for the same type of therapy as hydrocortisone. Many naturally occurring steroids, and steroids readily prepared from naturally occurring ones, have a 3-keto $\Delta^4$ structure, but no 3-keto $\Delta^{1,4}$ compounds are readily available as raw materials. For this reason the process of this invention whereby it is possible to transform a 3-keto $\Delta^4$ compound having from 18 to 21 atoms in the carbon skeleton into a 3-keto $\Delta^{1,4}$ compound in one single step in large-scale commercial production is of tremendous value.

The outstanding results disclosed in this application are not fully understood. It is expected, however, when a large inoculum of Nocardia or Corynebacterium species is employed as described above, particularly in large-scale production, that the steroids of the reaction mixture are consumed in the growth of the bacteria. It is thought but not known with certainty, that the antibiotic at certain levels in some manner blocks the enzyme systems involved in the destruction of steroids, but at the same time allows the oxidizing enzymes to convert 3-keto $\Delta^4$ steroids to 3-keto $\Delta^{1,4}$ steroids, i.e. introduce a double bond at the one position of 3-keto $\Delta^4$ steroids. Generally, this invention teaches that antibacterial antibiotics when employed at certain levels enhance the production of 3-keto $\Delta^{1,4}$ steroids from 3-keto $\Delta^4$ steroids by minimizing the destruction of the steroid content of the reaction medium employed.

The following examples are given by way of illustration and are not to be construed as limitations of this invention many variations of which are possible within the scope and spirit thereof.

*Example I*

Curvularia lunata, NRRL–2380, was grown for 24 hours at 28° C. in an inoculum of soybean meal and $K_2HPO_4$ medium. During growth, the mixture was stirred at the rate of 300 revolutions per minute and aerated at the rate of one-half volume of air per volume of medium per minute.

Five gallons of this inoculum was added under sterile conditions to 100 gallons of a sterile fermentation medium having the following composition:

| | Percent |
|---|---|
| $NaNO_3$ | 0.2 |
| $MgSO_4.7H_2O$ | 0.05 |
| KCl | 0.05 |
| $FeSO_4 7H_2O$ | 0.001 |
| Sucrose | 1.0 |
| $CaCl_2$ | 0.05 |
| $Na_4P_2O_7$ | 0.4 |
| Tween 80 (Atlas Power Co.) (by volume) | 0.25 |
| Soybean meal | 3.0 | pH adjusted to 7.0 with KOH after sterilizing.

The fermentation medium was stirred at 1150 revolutions per minute and aerated at a rate of one-half volume of air per volume of medium per minute for 24 hours at 28° C. The medium was then diluted with two volumes of sterile water. Compound S monoacetate (150 g.) dissolved in 3.3 liters of methyl Cellosolve by heating to about 80° C. was then added to 100 gallons of the diluted medium. The conversion to Compound F may be followed conveniently by paper chromatography. After from 12 to 24 hours, Compound S was converted to 90 grams of Compound F. The pH was adjusted to 7.5 with KOH after 35 gallons of sterile water was added. The diluted mixture was heated at 80° C. for about five minutes and fifteen gallons of a supplement of the following composition was added:

| | Percent |
|---|---|
| $NH_4NO_3$ | 4.0 |
| $K_2HPO_4$ | 8.7 |
| $MgSO_4.7H_2O$ | 0.25 |
| NaCl | 0.005 |
| $FeSO_4.7H_2O$ | 0.0001 |
| Fumaric acid | 2.0 | pH adjusted to 7.0 with KOH.

Nocardia opaca, ATCC 4276, was grown with stirring at 300 revolutions per minute and aeration at a rate of one-half volume of air per volume of medium per minute for 40 hours at 28° C. in an inoculum with the following composition:

| | Percent |
|---|---|
| Cornsteep liquor | 1 |
| Soybean meal | 1 |
| Glycerol | 2 |
| Blackstrap molasses | 0.2 |
| $CaCO_3$ | 0.1 | pH is adjusted to 7.0 before adding $CaCO_3$.

Seven and a half gallons of this inoculum was added to the main reaction mixture containing Compund F which was then aerated at a rate of one half volume of air per volume of medium per minute. Before the addition of inoculum sufficient oxytetracycline hydrochloride is added to the main reaction mixture containing Compound F to provide 5 mcg. of the antibiotic per milliliter of the final reaction volume. The reaction medium is maintained at 28° C. while aerating at a rate of one half volume of air per volume of medium per minute. After 40 hours prednisolone is obtained in excellent yield, 68% yield based on Compound F being obtained by extracting the reaction mixture with chloroform, applying the extract to a silica gel chromatography column and eluting with mixtures of methylene chloride and ethanol.

Example II

N. opaca, ATCC 4276, was grown as in Example I. A reaction medium was prepared by adding 10 gallons of the supplement described in Example I to 100 gallons of water adjusted to pH 7.5 with KOH and previously heated at 80° C. for about five minutes.

Five and one half gallons of the N. opaca growth medium was then added to the reaction medium. Sufficient tetracycline hydrochloride to provide a level of 2 mcg./ml. of tetracycline was then added together with 60 g. of crystalline Compound F. In 40 hours, an 86% yield of prednisolone was obtained as in Example I.

Example III

C. lunata, NRRL-2380, was grown as in Example I employing the following sterile fermentation medium:

| | |
|---|---|
| Cerelose | 1.0%. |
| Lactose | 2.0%. |
| Cornsteep liquor | 6.0%. |
| $Na_2SO_4$ | 0.1%. |
| Cornmeal | 1.2%. |
| Soybean oil | 10 ml./gal. |
| $CaCO_3$ | 0.55%. | pH adjusted to 6.25 with KOH before adding $CaCO_3$.

The procedure of Example I was employed to convert 133 g. of Compound S to 75 g. of Compound F.

N. opaca, ATCC 4276, was grown as in Example I and Compound F converted to predisolone, employing the same procedure except that a mixture of oxytetracycline and neomycin sulfate sufficient to provide 13 mcg./ml. of oxytetracycline and 3.3 mcg./ml. of neomycin was used in place of oxytetracycline. In 40 hours, a 70% yield of predisolone was obtained.

Example IV

The process of Example I was repeated using in place of oxytetracycline, a sufficient amount of streptomycin sulfate to provide a level of 100 mcg. of streptomycin per milliliter of reaction medium. A 79% yield of predisolone was obtained.

Example V

The process of Example II was repeated employing N. globerula, ATCC 9356, in place of N. opaca with comparable results.

Example VI

The process of Example I was repeated employing a chlortetracycline level of 2 mcg. per milliliter of reaction medium with comparable results.

Example VII

The process of Example I was repeated employing in place of oxytetracycline a level of 1 mcg. of oxytetracycline and 0.25 mcg. of neomycin per milliliter of reaction medium. In 28 hours, a 68% yield of prednisolone was obtained.

Example VIII

The process of Example I was repeated employing in place of oxytetracycline 0.5 mcg. of oxytetracycline and 0.125 mcg. of neomycin. After 26 hours, a 64% yield of predisolone was obtained.

Example IX

The process of Example II was repeated employing 20 gallons of N. opaca growth medium in the presence of 1 mcg./ml. of oxytetracycline and 0.25 mcg./ml. of neomycin. In 16 hours, a 77% conversion of Compound F to prednisolone had taken place.

Example X

The precedure of Example I was repeated employing 27 gallons of N. opaca growth medium in the presence of 4 mcg./ml. of oxytetracycline and 1 mcg./ml of neomycin. In 60 hours, a 69% yield of prednisolone was obtained.

Example XI

The process of Example II was repeated employing in place of tetracycline a level of 15 mcg. of tetracycline per milliliter of reaction medium. In 40 hours, an 80% yield of prednisolone was obtained.

Example XII

The process of Example II was repeated employing in lieu of tetracycline, sufficient neomycin sulfate to provide a level of 4 mcg. of neomycin per milliliter of reaction medium. In 40 hours, a 68% yield of prednisolone was obtained.

Example XIII

The process of Example II was repeated employing in lieu of tetracycline a level of 1 mcg. of neomycin per milliliter of recation medium with comparable results.

Example XIV

The process of Example I was repeated employing Compound S in place of Compound S monoacetate with identical results.

Example XV

The process of Example I was repeated employing in lieu of oxytetracycline a level of 50 mcg. of dihydrostreptomycin per milliliter of reaction medium with comparable results.

Example XVI

The process of Example III was repeated employing a level of 200 mcg. of streptomycin per milliliter of reaction medium with comparable results.

Example XVII

The process of Example II was repeated employing C. simplex, ATCC 6946, with comparable results.

Example XVIII

The process of Example II was repeated using the following steroids:

Compound S
9α-fluoro—Compound F
$\Delta^{4,6}$-androstadiendione
11β,17α-hydroxyprogesterone
$\Delta^{14}$-dehydro—Compound S
Androstenedione
19-nortestesterone
17α-hydroxypregesterone 16-dehydroprogesterone
11-ketopregesterone
$\Delta^{9(11)}$-dehydro-Compound S
14α,15α-epoxido—Compound S
(This compound may be obtained by the method described in copending application, Serial Number 459,848, filed October 1, 1954.)
14α,15α-epoxido—Compound F
(This compound may be obtained by the method described in copending application, Serial Number 432,621, filed May 26, 1954.)
14α-hydroxy hydrocortisone
This compound may be obtained by the method of U. S. Patent 2,745,784.
14α-hydroxy cortisone
(This compound may be obtained by the method of U.S. Patent 2,788,354.

In each case the products were recovered from the reaction mixture by extraction and were subjected to evaluation by the paper chromatography method. In each case, it was found that a double bond had been introduced at the 1-position.

What is claimed is:

1. In a process for the preparation of a 3-keto $\Delta^{1,4}$ steroid compound by contacting a 3-keto $\Delta^4$ steroid compound having from 18 to 21 atoms in the carbon skeleton with oxidizing enzymes of an organism selected from the group consisting of the genus Nocardia and the genus Corynebacterium, the improvements which comprise employing the inoculum of said organism in the proportion of between about 5% and about 20% of the total reaction volume, and conducting the reaction in the presence of a small amount of at least one antibacterial antibiotic, said amount being sufficient to enhance the production of the desired $\Delta^{1,4}$ steroid but insufficient to cause total blocking of the enzyme systems of said organism.

2. A process as claimed in claim 1, wherein the antibiotic is tetracycline.

3. A process as claimed in claim 1, wherein the antibiotic is oxytetracycline.

4. A process as claimed in claim 1, wherein the antibiotic is chlortetracycline.

5. A process as claimed in claim 1, wherein the antibiotic is neomycin.

6. A process as claimed in claim 1, wherein the antibiotics are neomycin and oxytetracycline.

7. A process for the preparation of a 3-keto $\Delta^{1,4}$ steroid compound which process comprises contacting a 3-keto $\Delta^4$ steroid compound having from 18 to 21 atoms in the carbon skeleton with oxidizing enzymes of an organism selected from the group consisting of the genus Nocardia and the genus Corynebacterium, the inoculum of said organism employed being between about 5% and about 20% of the total reaction volume, in the presence of from about 2 to about 15 mcg. of tetracycline per milliliter of reaction mixture.

8. A process for the preparation of a 3-keto $\Delta^{1,4}$ steroid compound which process comprises contacting a 3-keto $\Delta^4$ steroid compound having from 18 to 21 atoms in the carbon skeleton with oxidizing enzymes of an organism selected from the group consisting of the genus Nocardia and the genus Corynebacterium, the inoculum of said organism employed being between about 5% and about 20% of the total reaction volume, in the presence of from about 2 to about 15 mcg. of oxytetracycline per milliliter of reaction mixture.

9. A process for the preparation of a 3-keto $\Delta^{1,4}$ steroid compound which process comprises contacting a 3-keto $\Delta^4$ steroid compound having from 18 to 21 atoms in the carbon skeleton with oxidizing enzymes of an organism selected from the group consisting of the genus Nocardia and the genus Corynebacterium, the inoculum of said organism employed being between about 5% and about 20% of the total reaction volume, in the presence of from about 2 to about 15 mcg. of chlortetracycline per milliliter of reaction mixture.

10. A process for the preparation of a 3-keto $\Delta^{1,4}$ steroid compound which process comprises contacting a 3-keto $\Delta^4$ steroid compound having from 18 to 21 atoms in the carbon skeleton with oxidizing enzymes of an organism selected from the group consisting of the genus Nocardia and the genus Corynebacterium, the inoculum of said organism employed being between about 5% and about 20% of the total reaction volume, in the presence of from about 1 to about 4 mcg. of neomycin per milliliter of reaction mixture.

11. A process for the preparation of a 3-keto $\Delta^{1,4}$ steroid compound which process comprises contacting a 3-keto $\Delta^4$ steroid compound having from 18 to 21 atoms in the carbon skeleton with oxidizing enzymes of an organism selected from the group consisting of the genus Nocardia and the genus Corynebacterium, the inoculum of said organism employed being between about 5% and about 20% of the total reaction volume, in the presence of from about 0.5 to about 4 mcg. of oxytetracycline per milliliter of reaction mixture and from 0.125 mcg. to about 1 mcg. of neomycin per milliliter of reaction mixture.

References Cited in the file of this patent

UNITED STATES PATENTS

| | | |
|---|---|---|
| 2,236,574 | Koester | Apr. 1, 1941 |
| 2,649,402 | Murray | Aug. 18, 1953 |
| 2,776,927 | Shull | Jan. 8, 1957 |
| 2,789,118 | Bernstein | Apr. 16, 1957 |
| 2,806,043 | Bernstein | Sept. 10, 1957 |
| 2,837,464 | Nobile et al. | June 3, 1958 |

OTHER REFERENCES

Weinberg: Bacteriological Reviews, vol. 21, No. 1, March 1957, article, pages 6–7, 47–68.